(12) United States Patent
Köhnsen

(10) Patent No.: US 10,814,939 B2
(45) Date of Patent: Oct. 27, 2020

(54) INFLATABLE SURF BOARD WITH AN ELECTRIC DRIVE

(71) Applicant: SASHAY GMBH, Hamburg (DE)

(72) Inventor: Benjamin Köhnsen, Scharbeutz (DE)

(73) Assignee: WBV Weisenberger Bau+Verwaltung GmbH, Rastatt (DE)

(*) Notice: Subject to any disclaimer, the term of this patent is extended or adjusted under 35 U.S.C. 154(b) by 244 days.

(21) Appl. No.: 15/569,677

(22) PCT Filed: Oct. 5, 2015

(86) PCT No.: PCT/EP2015/072930
§ 371 (c)(1),
(2) Date: Oct. 26, 2017

(87) PCT Pub. No.: WO2016/055410
PCT Pub. Date: Apr. 14, 2016

(65) Prior Publication Data
US 2018/0118311 A1    May 3, 2018

(30) Foreign Application Priority Data

Oct. 7, 2014  (DE) .................. 10 2014 114 549
Mar. 10, 2015  (DE) .................. 10 2015 103 503

(51) Int. Cl.
*B63B 32/10*    (2020.01)
*B60L 50/60*    (2019.01)
(Continued)

(52) U.S. Cl.
CPC .............. *B63B 32/10* (2020.02); *B60L 50/66* (2019.02); *B63B 7/085* (2013.01); *B63B 32/51* (2020.02); *B63B 32/60* (2020.02); *B63H 11/113* (2013.01); *B63H 21/17* (2013.01); *B60L 2200/32* (2013.01); *Y02T 10/705* (2013.01); *Y02T 10/7005* (2013.01)

(58) Field of Classification Search
CPC . B63B 35/79; B63B 35/7913; B63B 35/7943; B63B 32/10; B63B 32/51; B63B 32/60
See application file for complete search history.

(56) References Cited

U.S. PATENT DOCUMENTS 4,020,782 A * 5/1977 Gleason .............. B63B 35/7943
114/55.58
4,811,682 A * 3/1989 Hwang .................. B63B 7/087
114/345

(Continued)

FOREIGN PATENT DOCUMENTS

DE      2155978 A1 *  5/1973   ......... B63B 35/7913
DE      4404241 A1 *  8/1995   ............. B63B 35/79
(Continued)

*Primary Examiner* — Ajay Vasudeva
(74) *Attorney, Agent, or Firm* — Bay State IP, LLC

(57) ABSTRACT

A surf board which may be broken into two parts, into an inflatable body component and a drive component, wherein the drive component has an electrical drive and forms, or at least partially forms, a tail of the surf board. The surf board can be controlled particularly well by the formation of the drive component as the tail, and it has a higher degree of efficiency. Furthermore it is simple and manageable to transport if the air is let out of the body component.

12 Claims, 3 Drawing Sheets

Figure 1:
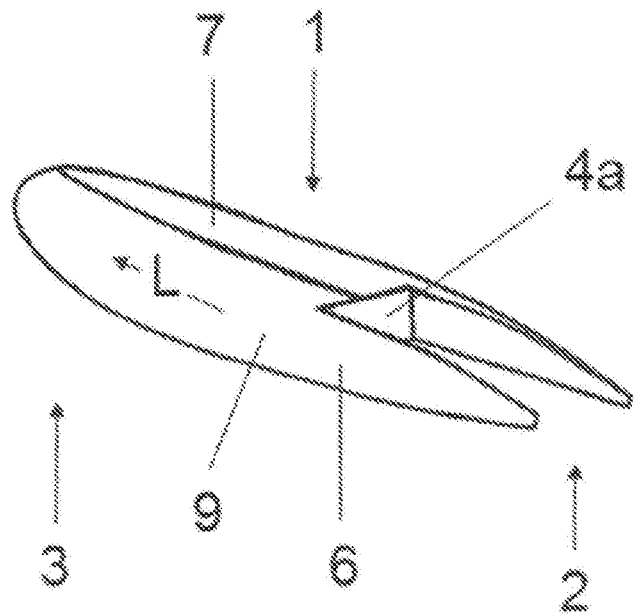

(51) Int. Cl.
  *B63B 32/51*  (2020.01)
  *B63B 32/60*  (2020.01)
  *B63B 7/08*  (2020.01)
  *B63H 21/17*  (2006.01)
  *B63H 11/113*  (2006.01)

(56) References Cited

U.S. PATENT DOCUMENTS

| | | | |
|---|---|---|---|
| 5,105,753 A * | 4/1992 | Chih | ............... A63B 35/12 |
| | | | 114/315 |
| 8,142,248 B2 * | 3/2012 | Myerscough | ....... B63B 35/7933 |
| | | | 441/79 |
| 9,114,862 B2 * | 8/2015 | Dingel | ................ B63B 35/7913 |
| 10,526,057 B2 * | 1/2020 | Kohnsen | ................ B63B 32/10 |
| 2003/0167991 A1 | 9/2003 | Namanny | |
| 2006/0292942 A1 | 12/2006 | Liao | |
| 2012/0000409 A1 | 1/2012 | Railey | |
| 2013/0059489 A1 | 3/2013 | Vlock | |
| 2014/0080369 A1 | 3/2014 | Haller et al. | |

FOREIGN PATENT DOCUMENTS

| | | | |
|---|---|---|---|
| DE | 20 2011 051 071 U1 | 12/2011 | |
| JP | 2002154479 A * | 5/2002 | |
| JP | 2003-26085 A | 1/2003 | |
| JP | 2003026085 A * | 1/2003 | |
| WO | 2013/036536 A2 | 3/2013 | |
| WO | WO-2014164522 A1 * | 10/2014 | ............. B63H 23/24 |
| WO | WO-2018149044 A1 * | 8/2018 | |

\* cited by examiner

REPLACEMENT SHEET

INFLATABLE SURF BOARD WITH AN ELECTRIC DRIVE

CROSS REFERENCE TO RELATED APPLICATION

This application is for entry into the U.S. National Phase under § 371 for International Application No. PCT/EP2015/072930 having an international filing date of Oct. 5, 2015, and from which priority is claimed under all applicable sections of Title of the United States Code including, but not limited to, Sections 120, 363, and 365(c), and which in turn claims priority under 35 USC 119 to German Patent Application No. 10 2014 114 549.6 filed on Oct. 7, 2014 and German Patent Application No. 10 2015 103 503.0 filed on Mar. 10, 2015.

The invention relates to a surf board.

Surf boards are well known in the prior art for example from DE 20 2011 051 071.9. This surf board is provided with a solid hull, and a jet drive is installed in the tail section thereof. The jet drive is controlled by means of a remote control. The surf board is heavy and cumbersome and therefore can only be transported with difficulty.

WO 2013 036 536 A2 discloses both an inflatable rubber dinghy with a drive unit and also a surf board, which in its central part has a drive unit which can be employed as required or has an underwater surface unit which closes the underwater surface. A disadvantage is that control of this inflatable surf board is only possible with difficulty. Moreover, the efficiency of a jet drive located in the centre is low, because water is first of all drawn in and must then be expelled again downwards into the sea water. A drive in the central region is also disadvantageous for fast travel, since during fast travel the surf board travels predominantly on the rear region and the drive in the central region would draw air.

It is an object of the present invention to provide a surf board which avoids the above-mentioned disadvantages.

This object is achieved by an aforementioned surf board with the features of claim 1.

The invention makes use of the idea of dismantling the surf board into two parts, into an inflatable body component and a drive component, wherein the drive component has an electrical drive and forms, or at least partially forms, a tail of the surf board. The surf board can be controlled particularly well by the formation of the drive component as the tail, and it has a higher degree of efficiency. Furthermore it is simple and manageable to transport if the air is let out of the body component.

Advantageously the drive component is disposed releasably by means of the fastening device on the body component. As a result the surf board can be dismantled into the two components and can be transported particularly easily.

The fastening device preferably has an insertion mechanism. Thus simple assembly and disassembly is ensured.

In another embodiment of the invention the drive component is permanently fastened to the body component by means of an adhesive. In this way a particularly durable connection of the two components is provided. The adhesive is preferably temperature- and water-resistant.

The electrical drive advantageously comprises a jet drive. In this way a particularly high-performance surf board is provided. The jet drive is particularly rugged, because a propeller is disposed so as to be protected in a channel.

The electrical drive can also comprise a propeller which is provided below the underwater surface and is constructed like a conventional ship's propeller.

In a particular embodiment, the invention makes use of the idea of dismantling the surf board into two parts, into an inflatable body component with a tail and a cutout disposed on the tail as well as a drive component with external dimensions which are adapted to internal dimensions of the cutout in an inflated state of the body component, wherein the drive component has an electrical drive. The body component preferably has a valve, by means of which the body component can be filled with air and by means of which air can also be let out. The drive component is releasably fitted in the opening. In this way the surf board can be easily dismantled and transported in a space-saving manner.

The drive component preferably has a rigid outer housing, in order in particular to accommodate equipment such as a battery, an electric motor for example as parts of a jet drive.

The drive component can have a water inlet on an underwater surface and a water outlet at the tail end with a pivotable or rigid nozzle and a propeller which is disposed in a pipe connection between the water inlet and the water outlet, is driven by means of the electrical drive and in the form of a jet drive enables propulsion of an inflated, assembled surf board. The nozzle can be provided so as to be pivotable by means of a control device. Furthermore, one or more fins can be disposed on the underwater surface of the drive component. The fins can also be fixed or pivotable: The pivoting movement of the fin can take place by means of an actuating drive which is supplied with current by means of the battery. The position of the fin can also be controlled by means of a control unit. The position of the nozzle and/or of the fin can be controlled by means of a remote control device held in the surfer's hand. It is also conceivable to configure the control by means of sensors which detect a tilting movement of the surf board in order to detect its longitudinal axis.

Inn a particularly preferred embodiment of the invention the body component is made from a drop stitch material. The drop stitch material is produced by the drop stitch method, wherein two or more lengths of synthetic fabric, preferably lengths of denier polyester fabric are laid one above the other. The two lengths of synthetic fabric are connected to one another by a plurality, i.e. thousands, of polyester threads. In this case the two lengths of fabric are kept spaced apart from one another, so that the space between the lengths of fabric which is filled with polyester threads can be filled with compressed air. The polyester threads are stitched for example with the aid of a dropdown stitch sewing machine on both sides to the two lengths of fabric. The two lengths of fabric which are stitched to one another form the support structure which gives the body component its mechanical strength in the inflated state.

The two lengths of fabric which are connected to one another are cut to the required shape. The upper and lower lengths of fabric are coated with PVC layers, preferably with three layers, and are pressed and bonded layer by layer. The faces are glued, overlapping, to the seam strip and are pressed, so that the airtight body component is produced.

The drop stitch method makes it possible to produce the inflatable body component with outstanding mechanical strength properties, which withstand not only tensile loads but also compressive loads and shearing loads.

The drop stitch outer skin of the inflatable body component is airtight and in the inflated state is exceptionally resistant to deformation, so that a surfer can stand and surf on the body component whilst retaining the external shape of the inflated body component. The body component is filled under high pressure. The filling can take place by means of a compressor. The compressor can be supplied with power by the battery installed in the surf board.

The body component made from the drop stitch material is preferably low-noise, because the volume of sound generated by the breaking of waves, but also by the drive, is damped by the body. The body component is subject to little vibration during operation, because vibrations are reduced by the drop stitch material. Since the body is easily deformable, impacts by waves, etc., are advantageously absorbed. Furthermore it is advantageous that the body, which is softer than conventional surf boards, causes fewer injuries if the surf board collides with the surfer in the event of the surfer falling off.

The deck of the attached component is preferably flush with the deck of the inflated body component, so that a common overall deck is formed by the body component and the drive component. For this purpose the drive component should be capable of insertion into the cutout by form fitting without a gap.

The underwater surface of the drive component is also advantageously flush with an underwater surface of the inflated body component, so that a smooth underwater surface is produced over the entire longitudinal extent of the surf board, thus favouring gliding of the surf board.

The cutout preferably has a frame which is provided with fastening means, and the drive component has complementary fastening means co-operating with the fastening means. The frame can be provided for example on lateral flanks of the cutout of the inflated surf board. The frame is advantageously rigid and resistant to deformation. It may be a plastic frame or a metal frame, in particular an aluminium frame.

The cutout preferably has, in a cross-section perpendicular to a longitudinal direction of the body component, contact surfaces which extend parallel to underwater surfaces and are in each case provided with a fastening means, and the drive unit has, in a cross-section perpendicular to the driving direction, complementary contact surfaces which are disposed parallel to the deck and in each case have a complementary fastening means, and the complementary contact surfaces lie precisely on the contact surfaces in the inflated and assembled state of the surf board. During assembly, the drive component is inserted more or less from above, that is to say on the side remote from the water, into the cutout, rests there on the contact surface and is secured, preferably by screw connections, against slipping.

Figure 2:
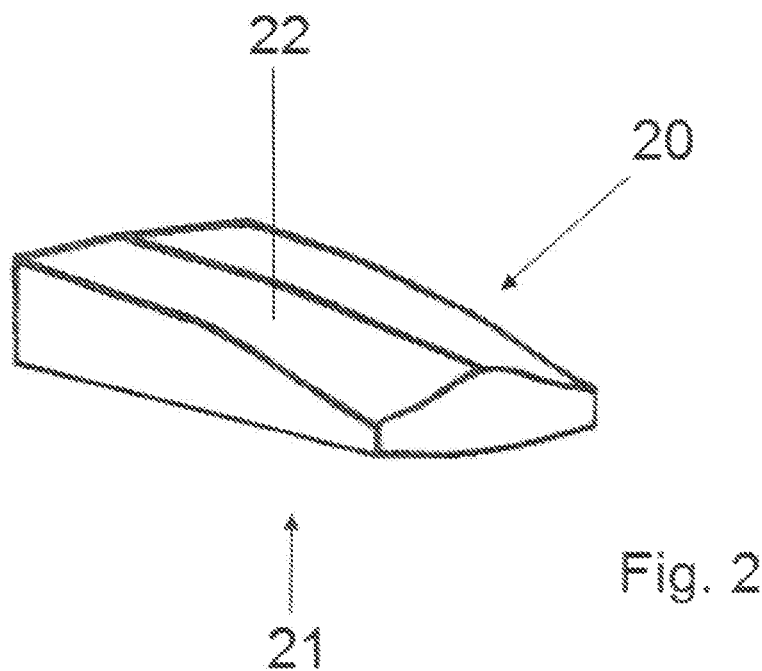
Figure 3:
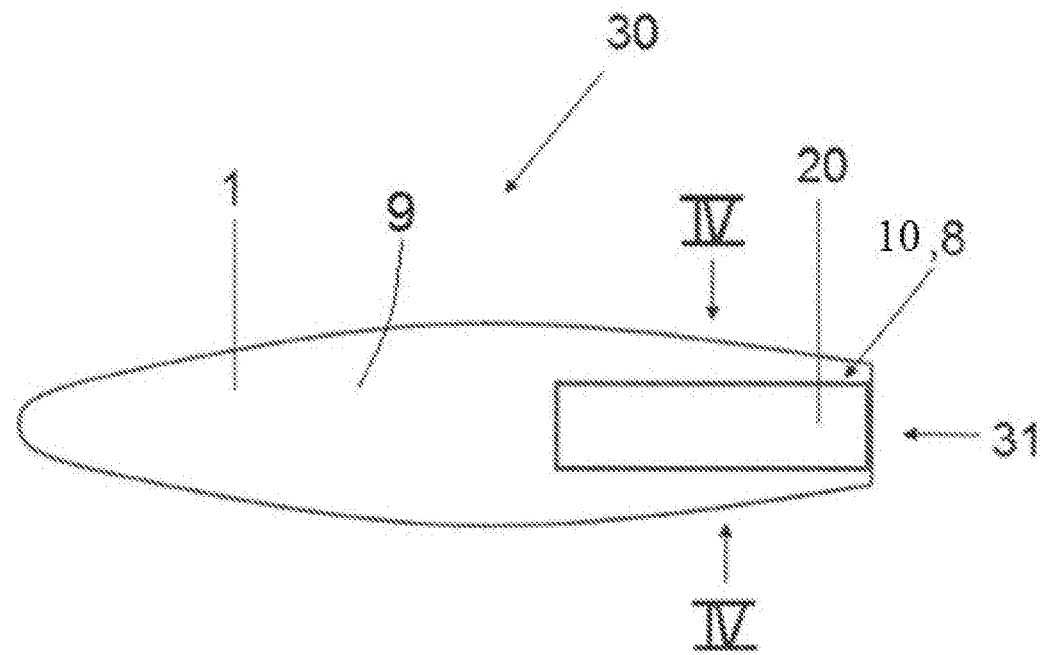
Figure 4:
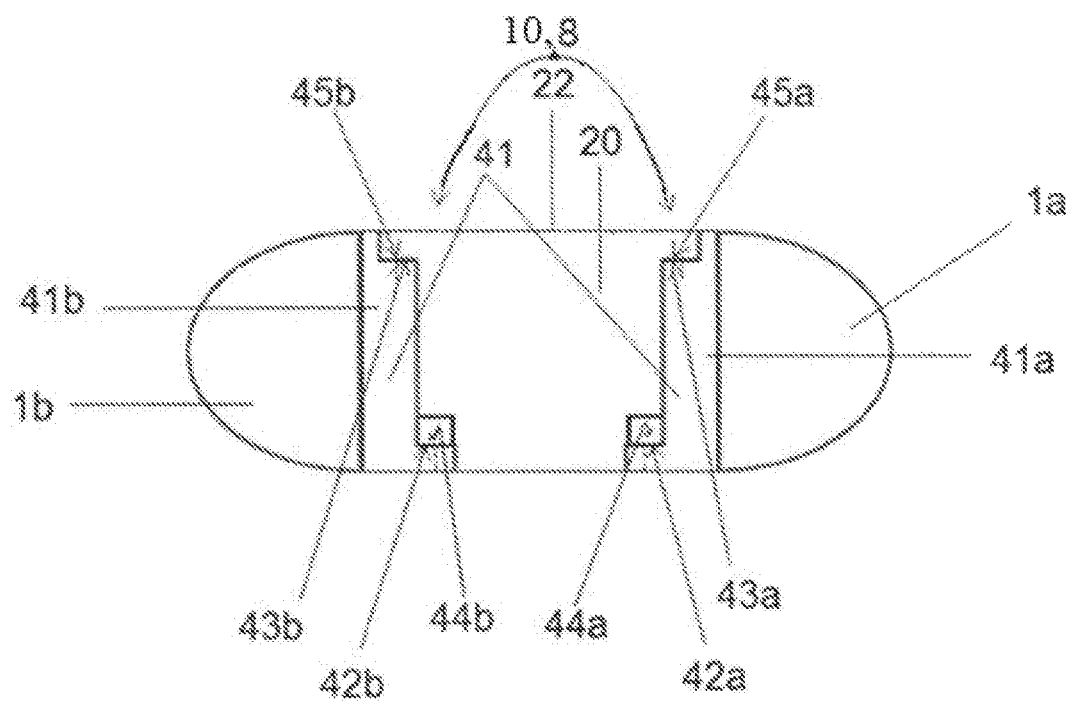
Figure 5:
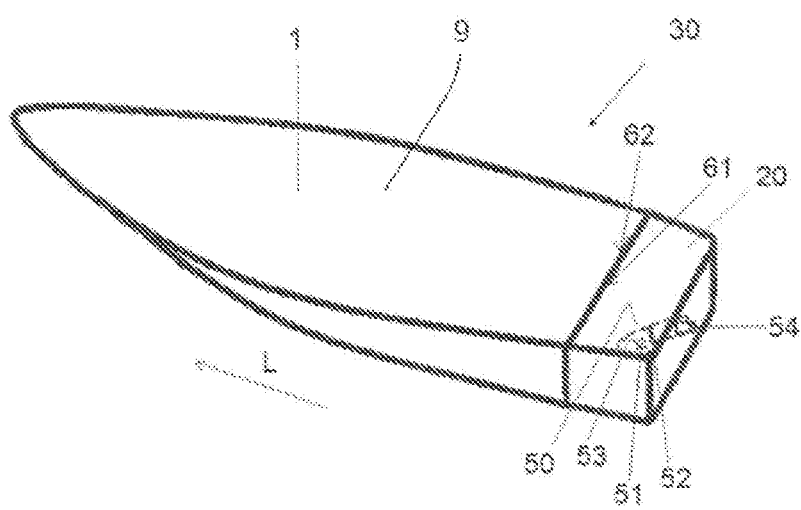

The invention is described with reference to embodiments in five figures. In the drawings:

FIG. 1 shows a perspective view of an inflated body component of a surf board according to the invention, FIG. 2 shows a perspective view of a drive component of the surf board according to the invention, FIG. 3 shows a schematic plan view of the surf board according to the invention, FIG. 4 shows a sectional view along the line IV in FIG. 3, FIG. 5 shows a second embodiment of the surf board according to the invention.

FIG. 1 shows an inflated body component 1 of the surf board according to the invention. The body component 1 has a longitudinal direction L which extends from the tail 2 of the body component 1 to the nose 3 of the body component 1. A cutout 4 is provided in the tail 2 of the body component 1. The body component 1 has an underwater surface 6 and a deck 7, which forms a part of an above-water surface. A surfer stands on his feet on the deck 7 during the operation of the surf board, or he kneels on the deck 7.

The body component 1 is made of a drop stitch material 9. A drop stitch material 9 should be understood to be a woven fabric which is impermeable to air with stabilising longitudinal threads. The cutout 4 on the tail 2 of the body component 1 is open contrary to the direction of travel which is usually oriented in the longitudinal direction L. The cutout 4 is rectangular and open towards the nose 3 of the body component 1. It is formed by a nose-end wall 4a disposed perpendicular to the longitudinal direction L and two lateral cutout walls 4b disposed in the longitudinal direction L. The nose-end as well as the two lateral cutout walls 4a, 4b are oriented substantially perpendicular to the deck 7.

The body component 1 is illustrated in FIG. 1 in the inflated state, although a drive component 20 is not inserted into the inflated body component 1, so that FIG. 1 shows the surf board inflated, but not assembled. The body component 1 in FIG. 1 is for instance 1.00 m to 4.00 m long and between 0.70 m and 1.00 m wide.

An inlet and outlet valve for air, by which the inflatable body component 1 can be filled, is not illustrated in FIG. 1. The air is blown in at high pressure into the body component 1. A compressor is usually used for this purpose.

FIG. 2 shows the drive component 20, which is adapted precisely in its external dimensions to the internal dimensions of the cutout 4 of the body component 1 in FIG. 1 and can be inserted into the opening 4 by form fitting. The drive component 20 comprises an electric motor, which can advantageously be supplied with current by means of a battery, as well as a fin (not shown) on an underwater surface 21. The fin can be adjustable.

The drive may be a jet drive with a water inlet (not shown) on the underwater surface 21 of the drive component 20 and a water outlet (not shown) in the region of a deck 22 of the drive component 20. A propeller is provided in a water channel connecting the water inlet and outlet. A pivotable nozzle, by which the water is sprayed out towards the rear counter to the direction of travel, is disposed at the water outlet. The propulsion and positioning of the nozzle can be controlled by means of a remote control device held in the hand of the surfer. However, it is also conceivable that the nozzle is not adjustable and the fin is adjustable and controllable. The control can also take place by displacement of the weight of the surfer on the surf board, so that a tilting movement about a longitudinal axis oriented in the longitudinal direction L is generated, which is detected and supplied to the control device by means of sensors provided therefor and disposed in the surf board.

The extent of the drive component 20 in the longitudinal direction L is for instance 1.00 m. The external shape of the drive component 20 is adapted to the external shape of the inflated body component 1 in such a way that in the assembled state the deck 7 of the inflated body component 1 is flush with the deck 22 of the drive component 20 and forms a flat overall surface. The same applies to the underwater surface 6 of the inflated body component 1 and the underwater surface 21 of the drive component 20.

FIG. 3 shows a schematic plan view of the surf board 30 with the inflated body component 1 and the drive component 20 inserted into the body component 1. A tail-end edge of the drive component 20 and also a tail-end edge of the inflated body component 1 are aligned with one another and form a flat tail-end edge 31 of the surf board 30.

FIG. 4 shows a sectional view along the line IV-IV in FIG. 3 in a tail section of the inflated assembled surf board 30. The sectional view shows a section through two lateral inflated flanks 1a, 1b of the body component 1 which laterally enclose the drive component 20. A solid frame 41, which is not inflatable and is permanently connected to the body component 1, is inserted in the cutout 4 of the inflated body component 1. The solid frame 41 has two opposing part-frames 41a, 41b, which in each case have two contact surfaces 42a, 43a, 42b, 43b which extend parallel to the underwater surface 21 and are in each case provided with at least one fastening device 8. The fastening device 8 may for example be a screw thread. The drive component 20 is inserted into the frame 41. The drive component 20 fits into the frame by form fitting. The drive component 20 has contact surfaces 44a, 45a, 44b, 45b co-operating in a complementary manner with the contact surface 42a, 43a, 42b, 43b. The complementary contact surfaces 44a, 45a, 44b, 45b are provided parallel to the deck 22 and, like the contact surfaces 42a, 43a, 42b, 43b, extend in the longitudinal direction L of the inflated surf board 30 along the entire frame 41. The drive component 20 is inserted into the frame 41 from above, i.e. remote from the seabed, and is screwed firmly to the threads of the contact surfaces 42a, 43a, 42b, 42b by means of screws through holes made in the drive component 20.

FIG. 5 shows a second embodiment of the surf board 30 according to the invention, with the inflatable body component 1 and the drive component 20, wherein the body component 1 in turn is made from a drop stitch material 9 which can be pumped up with the aid of a conventional air pump, bicycle air pump or the like, whilst the drive component 20, as also in the other embodiments, comprises a battery and constitutes the actual electrical drive which is constructed here in the form of a jet drive 50. The drive component 20 has an interior which is sealed against water ingress, whilst the electrical system is provided for the jet drive 50. The jet drive 50 has a propeller 52 which is disposed in a water channel 51, draws in water through an opening 53 on the underwater surface 21 of the drive component 20 and sprays it out above the surface of the water via a nozzle 54, in order to achieve propulsion. The drive component 20 has a width perpendicular to the longitudinal direction L of the surf board 30 which corresponds to the width of the surf board 30 itself. No lateral flanks 1a, 1b are provided here.

The surf board 30 has a flat contact surface 61 at its tail end 2, and the drive component 20 has a flat contact surface 62 which is complementary thereto with a shape and dimensions corresponding to those of the contact surface 61. The two contact surfaces 61, 62 can be permanently glued by means of a temperature- and water-resistant bonding adhesive, or in a third embodiment of the invention the drive component 20 can be releasably fastened to the body component 1 by means of an insertion mechanism 10 or the like. For this purpose the drive component 20 is pushed by means of T-shaped rails into two U-shaped profiled rails with inwardly bent lateral U walls at free ends, and additionally is releasably fastened by means of screws or similar devices, so that during the operation of the surf board 30 the drive component 20 is prevented from sliding out of the body component 1. In the second and third embodiment the surf board 30 is kept particularly narrow, since lateral flanks 1a, 1b can be omitted. The contact surface 52 of the drive component 20 and the contact surface 61 of the body component 1 do not necessarily have to be of planar construction. They can also be corrugated or can have other shapes. However, they should be co-ordinated with one another, so that the largest possible common contact surface is formed.

LIST OF REFERENCES 1 body component
1a laterally inflated flanks
1b laterally inflated flanks
2 tail
3 nose
4 cutout
4a nose-end wall
4b lateral cutout walls
6 underwater surface of the body component
7 deck of the body component
20 drive component
21 underwater surface of the drive component
22 deck of the drive component
30 surf board
31 flat tail-end edge
41 frame
41a part-frame
41b part-frame
42a contact surface
42b contact surface
43a contact surface
43b contact surface
44a complementary contact surface
44b complementary contact surface
45a complementary contact surface
45b complementary contact surface
50 jet drive
51 water channel
52 propeller
53 opening
54 nozzle
61 contact surface
62 complementary contact surface
L longitudinal direction

What is claimed is:

1. Surf board with an inflatable body component (1) with a tail (2) and a fastening device (8) disposed on the tail (2) for a drive component (20), wherein the drive component (20) has an electrical drive, characterised in that the body component (1) has a cutout (4) disposed on the tail (2) and the drive component (20) comprises a battery and has external dimensions adapted to the internal dimensions of the cutout (4) in an inflated state, and the drive component (20) is fitted releasably in the cutout (4), the cutout (4) on the tail (2) is open contrary to a direction of travel which is oriented in a longitudinal direction (L).

2. Surf board according to claim 1, characterised in that the drive component (20) is disposed releasably by means of the fastening device (8) on the body component (1).

3. Surf board according to claim 2, characterized in that the fastening device (8) has an insertion mechanism (10).

4. Surf Board according to claim 1, characterized in that the drive component (20) is permanently fastened to the body component (1) by means of an adhesive.

5. Surf board according to claim 1, characterized in that the electrical drive has a jet drive (50).

6. Surf board according to claim 1, characterized in that the electrical drive as a propeller (52).

7. Surf board according to claim 1, characterized in that the drive component (20) has a rigid outer housing.

8. Surf board according to claim 1, characterised in that the body component (20) is manufactured from a drop stitch material (9).

9. Surf board according to claim 1, characterised in that a deck (22) of the drive component (20) is aligned with a deck (7) of the inflatable body component (1).

10. Surf board according to claim 1, characterised in that an underwater surface (21) of the drive component (20) is aligned with an underwater surface (6) of the inflated body component (1).

11. Surf board according to claim 1, characterized in that the cutout (4) has a frame which is provided with the fastening device (8), and the drive component (20) has complementary fastening means co-operating with the fastening device (8).

12. Surf board according to claim 1, characterised in that the cutout (4) has, in a cross-section perpendicular to a longitudinal direction (L) of the body component (1), contact surfaces (42a, 42b, 43a, 43b) which extend parallel to the underwater surface (6) are in each case provided with the fastening device (8), and the drive component (20) has, in a cross-section perpendicular to the driving direction, complementary contact surfaces (44a, 44b, 45a, 45b) which are disposed parallel to the deck (22) and in each case have the complementary fastening device 8, and the complementary contact surfaces (44a, 44b, 45a, 45b) lie precisely on the contact surfaces (42a, 42b, 43a, 43b) in the inflated and assembled state of the surf board (30).

* * * * *